July 15, 1958 J. D. HOFFMAN, JR., ET AL 2,843,251

APPARATUS FOR ORIENTING FRUIT

Filed June 27, 1955 11 Sheets-Sheet 1

INVENTORS
JOHN D. HOFFMAN JR.
JAMES M. HAIT
BY Hans G. Hoffmeister
ATTORNEY

July 15, 1958 J. D. HOFFMAN, JR., ET AL 2,843,251

APPARATUS FOR ORIENTING FRUIT

Filed June 27, 1955 11 Sheets-Sheet 2

INVENTORS
JOHN D. HOFFMAN JR.
JAMES M. HAIT
BY Hans G. Hoffmeister
ATTORNEY

APPARATUS FOR ORIENTING FRUIT

INVENTORS
JOHN D. HOFFMAN JR.
JAMES M. HAIT
BY Hans G. Hoffmeister
ATTORNEY

INVENTORS
JOHN D. HOFFMAN JR.
JAMES M. HAIT
BY Hans G. Hoffmeister
ATTORNEY

APPARATUS FOR ORIENTING FRUIT

INVENTORS
JOHN D. HOFFMAN JR.
JAMES M. HAIT
BY Hans G. Hoffmeister
ATTORNEY

INVENTORS
JOHN D. HOFFMAN JR.
JAMES M. HAIT
BY Hans G. Hoffmeister
ATTORNEY

INVENTORS
JOHN D. HOFFMAN JR.
JAMES M. HAIT
BY Hans G. Hoffmeister.
ATTORNEY

July 15, 1958 J. D. HOFFMAN, JR., ET AL 2,843,251
APPARATUS FOR ORIENTING FRUIT
Filed June 27, 1955 11 Sheets-Sheet 8

INVENTORS
JOHN D. HOFFMAN JR.
JAMES M. HAIT
BY Hans G. Hoffmeister
ATTORNEY

INVENTORS
JOHN D. HOFFMAN JR.
JAMES M. HAIT
BY Hans G. Hoffmeister
ATTORNEY

INVENTORS
JOHN D. HOFFMAN JR.
JAMES M. HAIT
BY Hans G. Hoffmeister
ATTORNEY

July 15, 1958 J. D. HOFFMAN, JR., ET AL 2,843,251

APPARATUS FOR ORIENTING FRUIT

Filed June 27, 1955 11 Sheets-Sheet 11

INVENTORS
JOHN D. HOFFMAN JR.
JAMES M. HAIT

BY Hans G. Hoffmeister
ATTORNEY

United States Patent Office 2,843,251
Patented July 15, 1958

2,843,251

APPARATUS FOR ORIENTING FRUIT

John D. Hoffman, Jr., and James M. Hait, San Jose, Calif., assignors to Food Machinery and Chemical Corporation, San Jose, Calif., a corporation of Delaware Application June 27, 1955, Serial No. 518,054
15 Claims. (Cl. 198—33)

The present invention relates to methods of, and apparatus for, orienting fruit and more particularly to the orientation of sutured and indented fruit, such as peaches and apricots.

It is an object of the present invention to provide an improved method of orienting sutured and indented fruit.

Another object is to provide an improved method of, and apparatus for, orienting sutured and indented fruit by reliance upon the elongation of the stem indent of such fruit.

Another object is to provide simple, yet dependably operating apparatus for orienting sutured and indented fruit to place its suture plane into a predetermined position.

Another object is to provide a simple yet effective method of, and apparatus for, aligning the suture plane of sutured and indented fruit, that has previously been oriented with its stem indent in a predetermined position.

Another object is to provide a method of, and apparatus for aligning the suture plane of sutured and indented fruit that has its stem indent in a downwardly facing position.

These and other objects of the present invention will become apparent from the following description and accompanying drawings in which.

Figure 1:
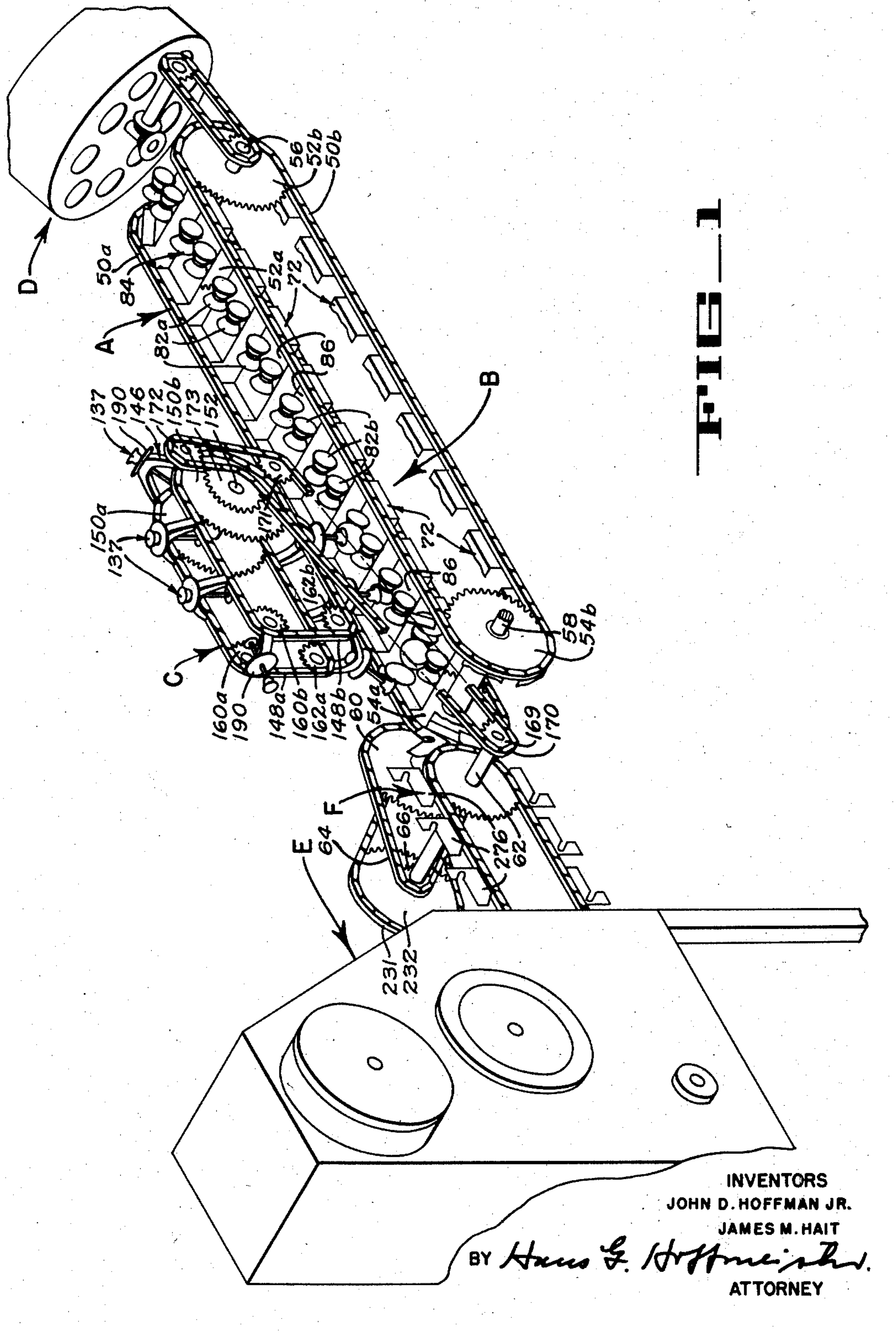
Fig. 1 is a schematic perspective of a fruit aligning machine of the present invention.

The fruit orienting apparatus of the present invention comprises a conveyor A (Figs. 1 and 2) which carries the fruit to be oriented into the suture plane aligning zone B underneath an overhead conveyor C. For the fruit to be effectively acted upon by the mechanisms of the present invention, it is necessary that the conveyor A delivers the fruit to the aligning zone B with its stem blossom axis in vertical position and its stem indent facing downwardly. For this reason the conveyor A which carries the fruit through the aligning zone B, may be formed by a fruit orienting conveyor such as the one described in detail in the copending patent application, Serial No. 169,042, filed June 19, 1950, for "Fruit Feeding and Orienting Means." The fruit orienting conveyor A receives fruit in random position from a rotary feed hopper D (Fig. 1) and is arranged to orient the fruit as it carries it along its upper horizontal run in such a manner as to place its stem indent into a downwardly-facing position. Having reference to Fig. 1 the conveyor A comprises a pair of endless sprocket chains **50*a* and 50*b* trained at opposite ends about pairs of sprockets 52*a*, 52*b* and 54*a*, 54*b*, respectively, that are mounted upon transverse shafts 56 and 58. Shaft 58 is the drive shaft of conveyor A and carries a third sprocket 60 to which rotary power is imparted from the shaft 62 of a subsequent transfer conveyor F through a sprocket chain 64 trained around sprocket 60 and another sprocket 66 firmly mounted upon shaft 62**. The transfer conveyor F receives the aligned fruit from the orienting conveyor A and delivers it to a slicing and pitting mechanism E.

Figures 2, 5:
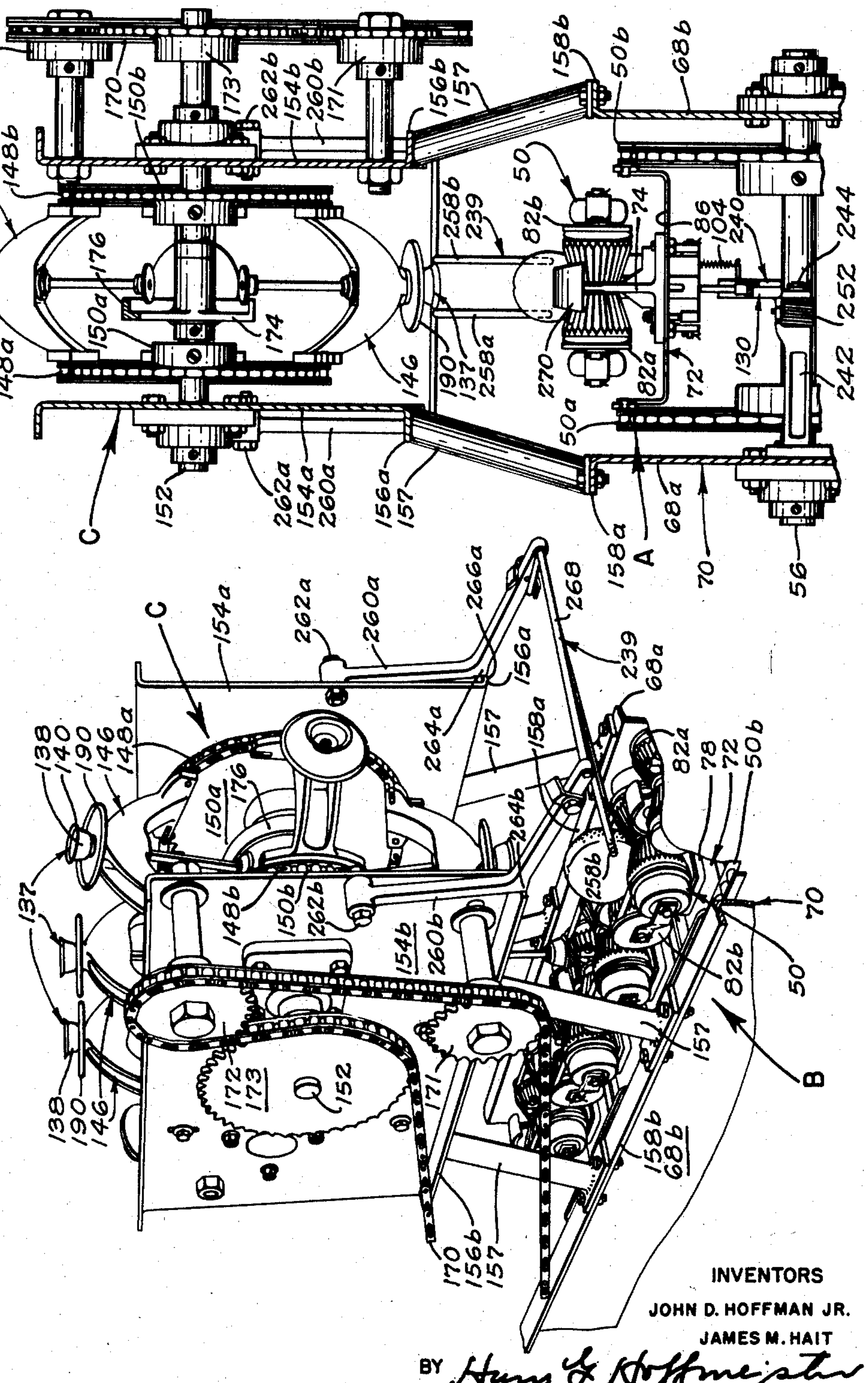
Fig. 2 is a perspective of the fruit aligning machine viewed from the feed end thereof.
Fig. 5 is a fragmentary transverse vertical section through the machine taken along lines 5—5 of Fig. 3.
Figure 4:
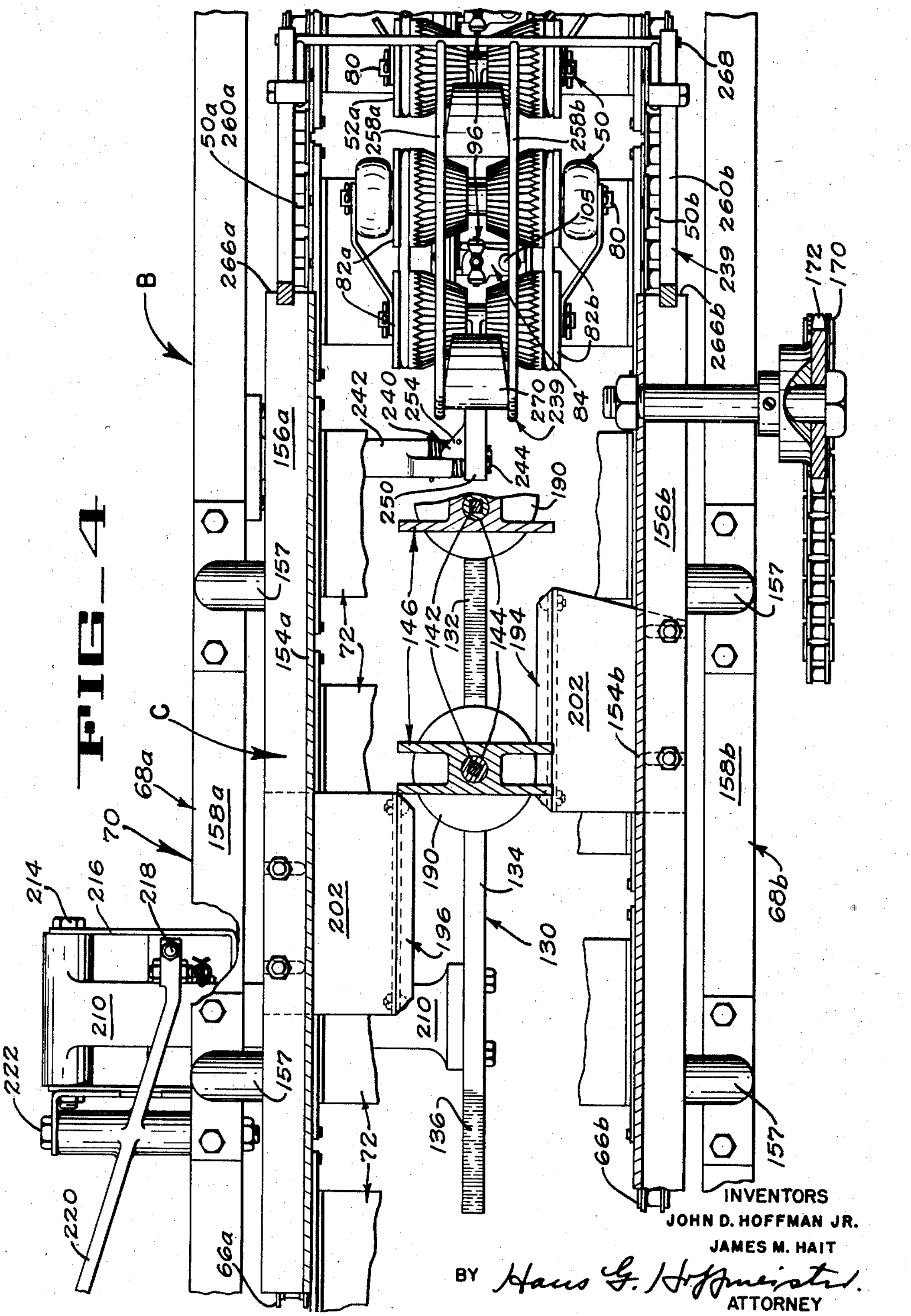
Fig. 4 is a fragmentary horizontal section of the fruit aligning machine taken along lines 4—4 of Fig. 3, with certain parts broken away to expose structure underneath.

The shafts 56 and 58 of conveyor A are journalled in vertically disposed side panels **68*a* and 68*b* which form part of the machine frame 70 (Figs. 2, 4 and 5). Suitably supported from and intermediately of the sprocket chains 50*a* and 50*b* is an endless sequence of carrier plates 72 of shallow U-shaped conformation. Every one of the plates 72 carries in tandem relation along its center line two juxtaposed standards 74 and 76 that rise from a common rectangular base frame 78 (Fig. 7) and each of said standards mounts a transverse spindle 80 upon the laterally projecting ends of which are supported serrated trunco-conical rollers 82*a* and 82*b* that face each other with their tapered ends (Fig. 4). The four rollers of the two adjacently positioned roller pairs supported from each carrier plate 72 form a pocket 84** into which the fruit is placed for conveyance through the suture aligning zone of the machine.

Figure 7:
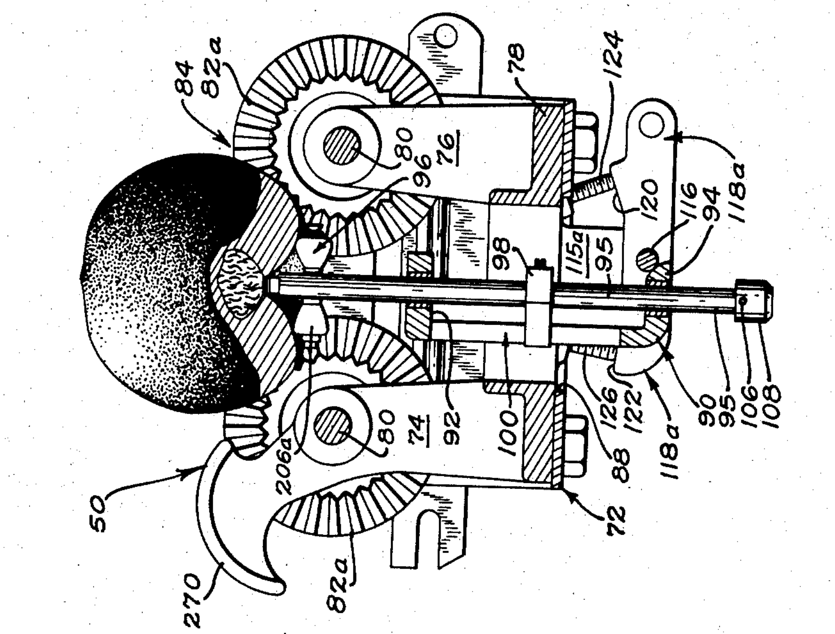
Fig. 7 is a longitudinal section through the fruit supporting unit illustrated in Fig. 6 taken along lines 7—7 thereof.
Figure 6:
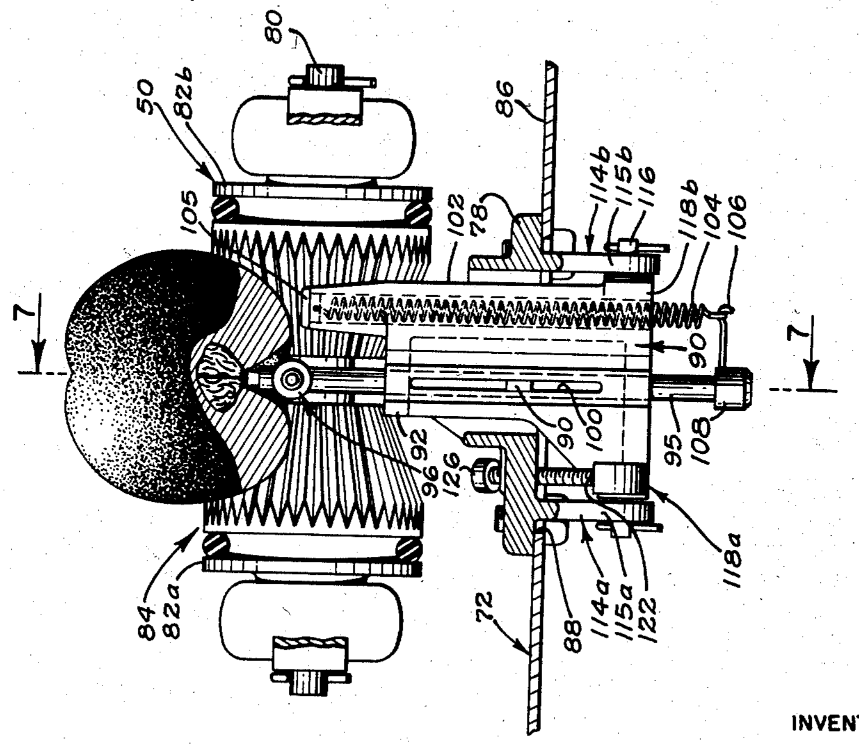
Fig. 6 is a detail view of one of the fruit supporting units of the fruit supply conveyor of the machine viewed in a direction opposite to the conveyor advance.
Figure 8:
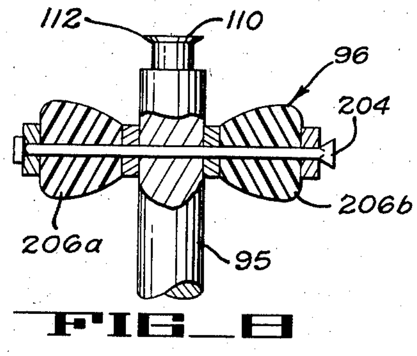
Fig. 8 is a side elevational detail view, partly in section, of a portion of the fruit supporting unit illustrated in Figs. 6 and 7.
Figure 9:
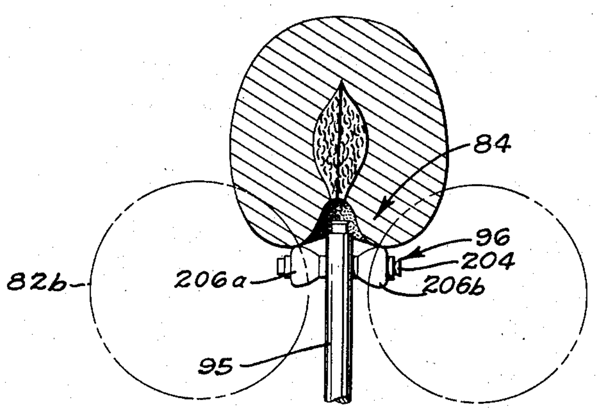
Figs. 9 and 10 are detail views illustrating different positions of fruit during orientation thereof.
Figure 10:
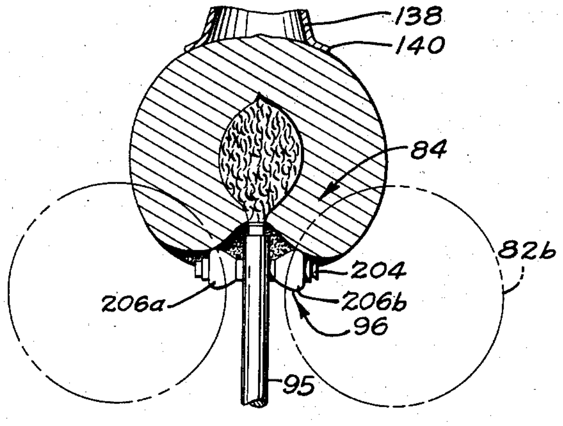

Below the rectangular base frame 78 the floor 86 of each of the U-shaped carrier plates 72 is provided with an aperture 88 (Figs. 6 and 7) and supported from the frame 78 within said aperture 88 is a bracket 90 that forms two vertically superposed guide loops 92 and 94 which are disposed above and below the floor 86 of plate 72, as best shown in Fig. 7. Slidably received within said guide loops is a rod 95. Said rod constitutes the suture plane finder element and carries near its tip a horizontally disposed cross member 96 (Fig. 8) that lies in the vertical plane to which it is desired to align the suture planes of all the fruit passed through the aligning zone B (Fig. 4). Said cross member is of an overall length that is slightly shorter than the elongation of the stem indent of the smallest specimen of the fruit that is to be processed by the machine. Hence, when a fruit is raised by the finder rod 95 above the rollers 82*a*, 82*b* with the suture-plane-indicating elongation of its downwardly facing stem indent angularly displaced from the cross member 96, the stem area of the fruit is actually supported upon the opposite ends of the cross member with the tip of rod 95 unable to make contact with the deepest point of the stem indent (Fig. 9). However, when the elongation of the stem indent of the fruit is aligned with the cross member, the fruit settles with its stem indent over the cross member and the tip of the finder rod 95 may actually contact the deepest point of the stem indent, as illustrated in Fig. 10. To prevent rotation of the rod 95 a radially projecting key 98 firmly secured to said rod intermediately of the guide loops 92 and 94 is arranged to engage a vertical guide slot 100 formed in the bracket 90 adjacent the finder rod 95 as best shown in Fig. 7.

To urge the rod 95 upwardly into the stem indent of a fruit that rests upon the trunco-conical rollers 82*a*, 82*b* with its stem indent facing downwardly, each bracket 90 forms adjacent the rod 95 a vertically-extending tubular housing 102 and disposed within said housing is a coil spring 104 (Fig. 6) which is tensioned between a cap 105 seated upon the upper end of the housing 102 and a hook 106 that projects radially from a head 108 formed at the lower end of the rod 95. While the spring 104 must be sufficiently strong to urge the finder rod 95 against the outer surface of a fruit resting upon the rollers 82*a*, 82*b* and into the stem indent thereof, it must not be strong enough to lift the fruit above said rollers; and to enable the fruit to cling to the rod 95 once said rod has penetrated into its stem indent, the tip of the rod is reduced in diameter as shown at 110 (Fig. 8) and forms a sharp-edged circular retaining rim 112.

Each of the brackets 90 is supported from the base frame 78 of the standards 74 and 76 in such a manner that the position of the finder rod 95 relative to the roller pairs may be adjusted in a fore or aft direction. For this purpose the side bars 114*a* and 114*b* (Fig. 6) of the base frame 78 on each of the U-shaped carrier plates 72 form downwardly-directed ears 115*a* and 115*b*, respectively, that extend through the aperture 88 in the floor 86 of the carrier plate and mount at a level below said floor a transverse spindle 116. Rotatably engaged over said spindle 116 and intermediately of the ears 115*a* and 115*b* are blocks 118*a* and 118*b* formed by the bracket 90 at about the level of its lower guide loop 94. Block 118*a* (Fig. 7) is formed in the manner of a substantially horizontally disposed bar that extends longitudinally of the conveyor advance and its upper edge forms at opposite sides of the spindle 116 relatively inclined surfaces 120 and 122. Threadably received within the side bar 114*a* of the base frame 78 are screw bolts 124 and 126 that extend downwardly from said side bar in directions at right angles to the relatively inclined surfaces 120 and 122, respectively, of block 118*a* and engage said surfaces with their lower extremities. Loosening the trailing set screw 124 and tightening the leading set screw 126 results in tipping the bracket 90 and the finder rod 95 rearwardly, and the opposite adjustment of said screws 124 and 126 tips the bracket and the finder rod forwardly.

As one of the described fruit supporting pockets moves into the aligning zone B with a fruit situated upon the four rollers thereof in stem indent downward position, the head 108 at the lower end of the finder rod 95 encounters a cam track 130 (Fig. 3) that is disposed underneath the upper horizontal run of the conveyor A and which is effective to lift the finder rod 95 above the serrated rollers 82*a*, 82*b*. The cam track 130 comprises a ramp portion 132 that rises gently to a substantially horizontal center portion 134 and said center portion is followed by a declining terminal portion 136 which serves to lower the fruit gradually onto the rollers 82*a*, 82*b* after alignment has been accomplished and offers the added advantage of serving as an uphill ramp to avoid entanglement of the heads 108 at the bottom of the finder rods 95 with the center portion 134 of the cam track 130 if the conveyor A should accidentally be operated in reverse.

Lest a fruit drop laterally from the finder rod 95, when said rod is elevated by the cam track 130 to lift the fruit above the rollers 82*a*, 82*b*, a yieldable retaining member 137 supported from the overhead conveyor C for free vertical movement, descends from above upon the fruit and engages its upwardly facing blossom area.

Figure 3:
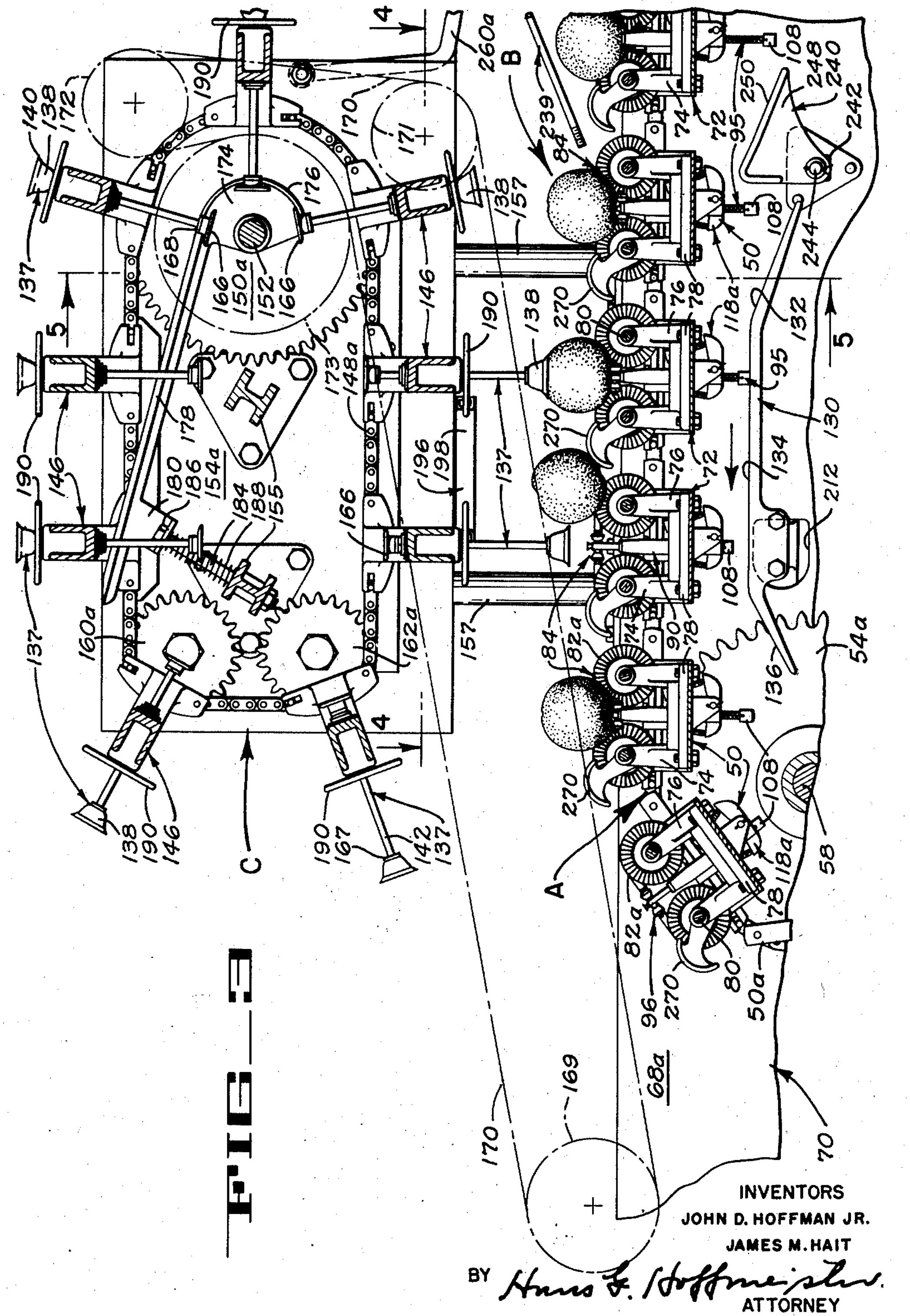
Fig. 3 is a fragmentary vertical medial section taken longitudinally of the fruit aligning machine illustrated in Figs. 1 and 2.
Figures 11, 12:
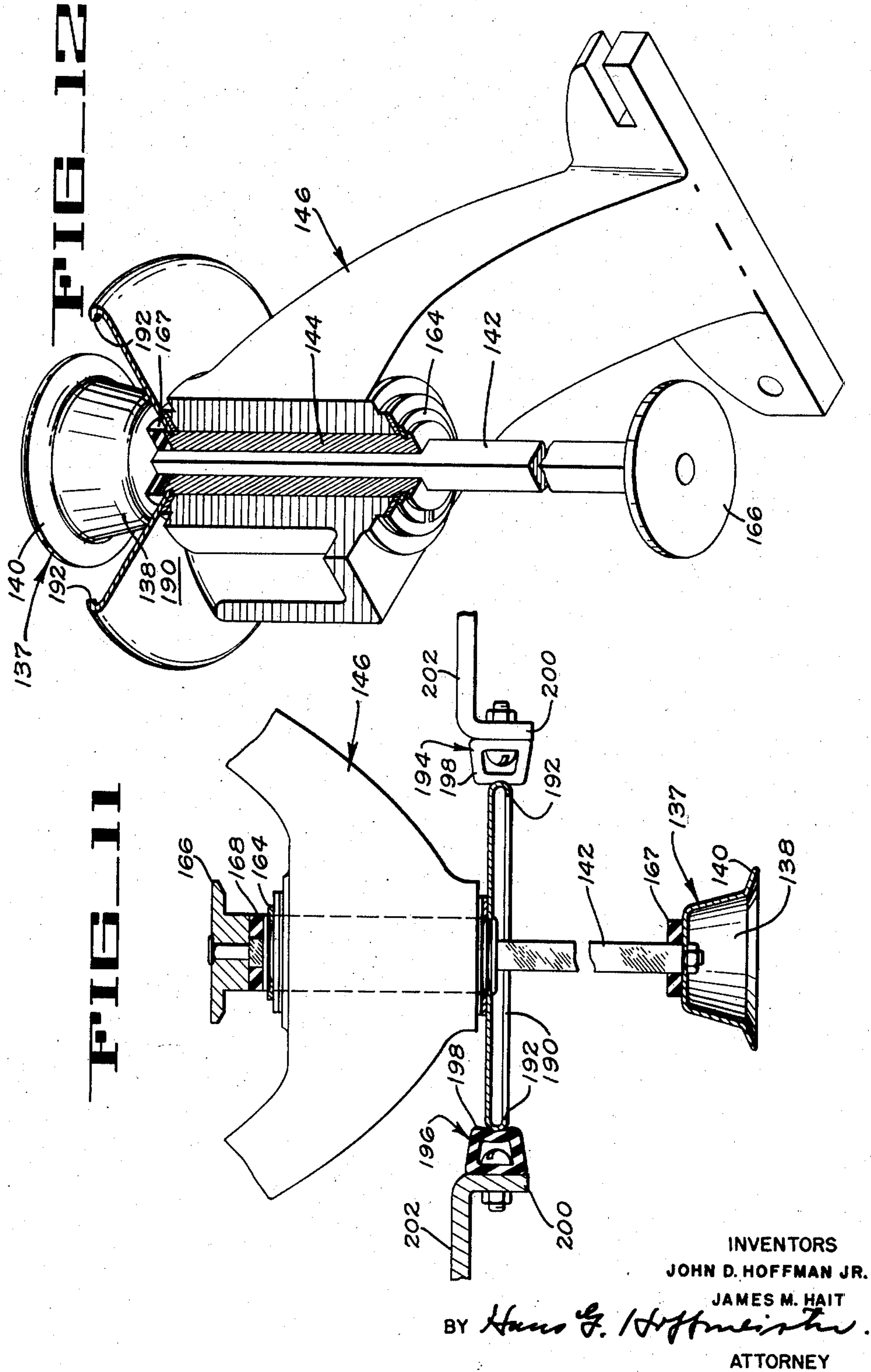
Fig. 11 is a fragmentary detail view, partly in section, of a part of the suture plane aligning mechanism of the machine.
Fig. 12 is a fragmentary perspective, showing the part of the suture aligning mechanism illustrated in Fig. 11 in inverted position.
Figure 13:
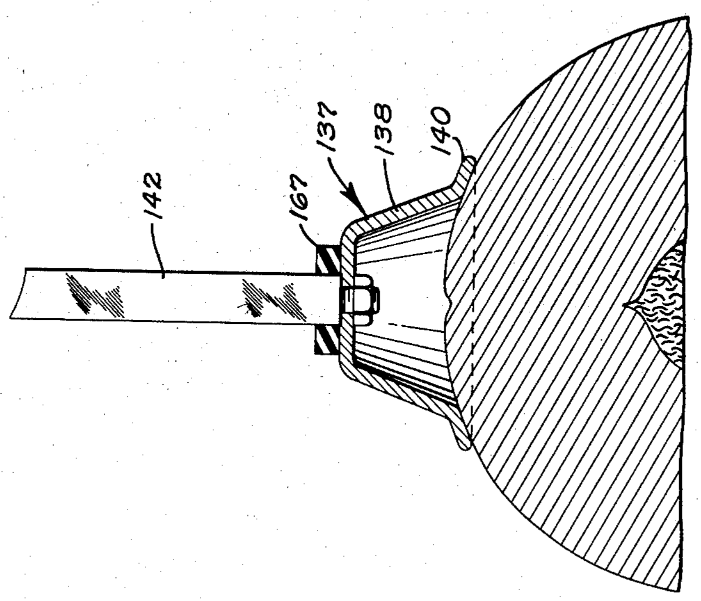
Fig. 13 is an enlarged, fragmentary detail view, similar to Fig. 11 illustrating the operation of the mechanism shown in Figs. 11 and 12.

Said retaining member may have the form of a trunco-conical cap 138 (Figs. 11 and 12) whose edge is flared outwardly to form an annular flange 140 that is adapted to engage an annular area of the fruit around the blossom end thereof as illustrated in Fig. 13. Said cap 138 is secured to a stem 142 which is of angular, and preferably square, cross section, as best shown in Fig. 12 and which is slidably received in a sleeve 144 that is rotatably mounted in the crest area of a yoke-shaped supporting arch 146. An endless sequence of such arches 146 each mounting a retaining member 137 is suitably supported from and between two parallel endless sprocket chains 148*a* and 148*b* that form the hereinbefore mentioned overhead conveyor C (Figs. 1, 2 and 5). Having reference to Figs. 1, 2 and 3, the sprocket chains 148*a* and 148*b* are trained around a pair of transversely spaced sprockets 150*a* and 150*b*, respectively, that are firmly mounted upon a transverse shaft 152. The shaft 152 is rotatably supported near the feed end of the described machine in two transversely spaced vertically disposed panels 154*a* and 154*b* that are rigidly connected by two centrally located transverse struts 155 (Fig. 3). Along their lower edges said panels 154*a* and 154*b* (Figs. 2 and 6) form outwardly directed flanges 156*a* and 156*b*, respectively, that rest upon brace bars 157 which rise from outwardly turned flanges 158*a* and 158*b* formed along the upper edges of the side panels 68*a* and 68*b* of the fruit supply conveyor A. Near the discharge end of the machine each of the sprocket chains 148*a* and 148*b* of overhead conveyor C is trained about pairs of superposed sprockets 160*a*, 162*a* and 160*b*, 162*b*, respectively (Fig. 1), which are of a smaller diameter than the sprockets 150*a* and 150*b* and which are rotatably supported from the adjacent side panels 154*a* and 154*b* as best understood in Fig. 3.

Reverting to the retaining members 137 (Figs. 12 and 13), the sleeve 144 in which the square stem 142 of each retaining member is slidably mounted and which in turn is rotatably received within one of the arches 146 of the overhead conveyor, is retained within its supporting arch by a snap ring 164, and to prevent disengagement of the slidable stems 142 from the sleeves 144 when the retaining members travel along the lower horizontal run of the overhead conveyor C, the inner end of each retaining member carries firmly mounted thereon a hubbed disk 166. To cushion the impact of the retaining caps 138 against the convex surfaces of their supporting arches 146, as the overhead conveyor carries the retaining members 137 from the lower horizontal run to the upper horizontal run thereof and causes their stems 142 to slide under the force of gravity in a direction inwardly of the conveyor chains, a washer 167 of resilient material, such as rubber, may be arranged around the stem of each retaining member adjacent the closed end of its cap; and similarly to cushion the impact of the hubbed disks 166 against the concave surfaces of their supporting arches, as the overhead conveyor carries the retaining members from the upper horizontal run to the lower horizontal run thereof, a washer 168 of resilient material, such as rubber, may be arranged around the stem 142 of each retaining member 137 adjacent the hub 165 of its disc 166, as best shown in Fig. 11.

The operation of the fruit supply conveyor A and of the overhead conveyor C is synchronized in such a manner that whenever a fruit supporting pocket 84 on conveyor A moves into the space below conveyor C, a retaining member 137 on the latter conveyor moves around the sprockets 150*a* and 150*b* into position above the particular pocket and thereafter travels along the lower run of the overhead conveyor in synchronism with the particular pocket while resting itself upon the blossom area of the fruit seated in said pocket. To establish the required synchronism, the overhead conveyor C is driven from the same source of rotary power as the fruit supporting conveyor A, namely the power shaft 62 of the hereinbefore mentioned transfer conveyor F (Fig. 1). For this purpose said shaft 62 carries firmly mounted thereon a small sprocket 169 around which is trained an endless sprocket chain 170 that is also trained around two idler sprockets 171 and 172 (Fig. 3) pivotally supported from side panel 154*b*, and which engages with its outer periphery a sprocket 173 firmly mounted upon the hereinbefore mentioned drive shaft 152 of the overhead conveyor C.

To prevent the retaining members 137 from prematurely sliding into their lowermost positions, as they move around the sprockets 150*a* and 150*b* at the feed end of the fruit aligning zone B, which might cause them to strike obliquely against an approaching fruit and push it from its supporting rollers 82*a*, 82*b* instead of retaining it in porperly centered position relative to said rollers, control means is provided that prevents outwardly sliding movement of the retaining members 137 until they reach a position wherein they are disposed vertically above the finder rod 95 of a roller unit on conveyor A. It is only when a retaining member is disposed above a fruit supported upon a roller unit underneath, with its center axis substantially coincident with the stem blossom axis of the fruit, that the retaining member may drop and place its cup 138 upon the blossom area of the fruit. Said control means comprises a substantially semi-circular disk 174 (Figs. 3 and 15) that is loosely mounted upon the hereinbefore mentioned drive shaft 152 of the sprockets 150*a* and 150*b* at the feed end of the fruit aligning zone. The outer circular edge of said disk 174 is turned laterally to form a retaining rim 176 along an arc corresponding to the return path, around shaft 152, of the disks 166 of the retaining members 137 when they are in their inwardly retracted position. As said disks approach the feed end of the fruit aligning zone B during their travel along the upper horizontal run of the overhead conveyor C, they engage underneath the rim 176 of disc 174 and are retained in inwardly retracted position by said rim until they have moved fully around the shaft 152.

Since the retaining members 137 may be splashed with fruit juices during operation of the machine and may thus get stuck in an outwardly projected position instead of sliding inwardly, as they move around the sprockets 160*a*, 160*b* and 162*a*, 162*b* at the discharge end of the fruit aligning zone, the upper end of the arcuate rim 176 may be extended into an obliquely rising stripping cam 178 (Fig. 3). Said cam reaches to a point near the trailing end of the upper horizontal run of the overhead conveyor C sufficiently high above said upper horizontal run to extend into the space above the path of the discs 166 of outwardly projected retaining members and below the path of their supporting arches 146. Thus, the disc of any retaining member that may be stuck in outwardly projected position, will engage underneath the free end of the stripping cam 178, and as said disk advances along the upper horizontal run of the overhead conveyor, it will be positively cammed downwardly into its inwardly retracted position, and be held in said position until it reaches a position vertically above a fruit on a roller unit of conveyor A underneath.

To prevent the retaining members from being bent or broken in the event that accidental reverse operation of the overhead conveyor C brings their disks against the outer surface of the stripping cam 178, the free end of said stripping cam i. e. the end remote from its supporting disk 174, is preferably mounted in such a manner that it may yield downwardly. For this purpose an ear 180 (Figs. 3 and 15) secured to the side of the stripping cam 178 is provided with an aperture 182 within which is loosely received a bolt 184 that is anchored in and rises from one of the hereinbefore mentioned cross struts 155. Above ear 180 the bolt 184 is provided with a radially extended head 186, and a spring 188 coiled around the bolt 184 and compressed between said strut 155 and the underside of ear 180, urges said ear yieldably against the head 186 of bolt 184. Thus, the stripping cam 178 is held in effective position to be engaged from below by the disks 166 of the retaining members 137 when said members advance in their proper direction, but when engaged along its outer surface by a disk 166 moving in reverse direction, it will yield downwardly and permit the disk to pass beyond its remote end without damage to itself or to the disk.

Due to the described position-control means for the retaining members 137, it is immaterial whether a fruit carried into the aligning zone is large or small. It will dependably be engaged by a retaining member at its blossom area and be retained upon the finder rod 95 during its travel through said aligning zone.

As soon as a retaining member 137 has engaged a fruit situated in a pocket 84 that enters the aligning zone B, the head 108 at the bottom of the finder rod 95 associated with the particular pocket comes against, and is lifted by, the ascending ramp 132 of cam track 130 which is effective to raise the fruit above the rollers 82*a*, 82*b*, and as the head at the bottom of the finder rod 95 travels along the elevated center portion 134 of cam track 130 causing the fruit to be held above the rollers 82*a*, 82*b* while the cup 140 of a retaining member 137 prevents the fruit from dropping from the finder rod 95, means enter into operation that turn the retaining member alternately in opposite directions. For this purpose the rotatable sleeve 144 within which the stem 142 of each retaining member is slidably mounted, projects a limited distance beyond the convex surface of its supporting arch 146 (Figs. 11 and 12) and firmly secured to the outwardly projecting end of said sleeve is a disc 190 of relatively large diameter whose circular edge is provided with an inwardly turned flange 192. As the retaining members 137 travel through the aligning zone B of the machine while supported from the lower horizontal run of the overhead conveyor C, their discs 190 encounter in succession two tracks 194 and 196 provided at opposite sides of their path through the aligning zone of the machine (Fig. 4). Said tracks may be formed by tubular fillets 198 (Fig. 11) of appropriate length which are preferably made of an elastic material, such as plastic or rubber, and which are suitably bolted to lips 200 formed along the inner edges of horizontally disposed mounting plates 202 that are adjustably secured to and project inwardly from the hereinbefore mentioned flanges 156*a* and 156*b*, respectively, of the side panels 154*a* and 154*b* (Figs. 3 and 4). Engagement of the discs 190 first with one and then with the other track is effective to turn each retaining member first in one and then in the opposite direction, while the fruit is supported upon the cross member 96 of a finder rod 95 and is therefore free to follow the tangential moment imparted to it through its frictional contact with the annular flange 140 of the rotating cap 138. In the particular embodiment of the invention illustrated in the accompanying drawings the length of the tracks 194 and 196 is so chosen that each will turn the passing retaining members 137 through an arc of about 180°. It will be understood that the tracks of greater or shorter length producing different degrees of rotation of the retaining members may be employed to suit particular circumstances. To facilitate rotation of the fruit upon the finder rod 95, the cross member 96 is preferably formed by a pin 204 whose opposite ends are provided with roller beads **206*a* and 206*b*** that may be made of a suitable plastic. As best shown in Fig. 8 said roller beads are preferably of conical shape with their tapering ends pointing toward each other.

Figures 15, 16:
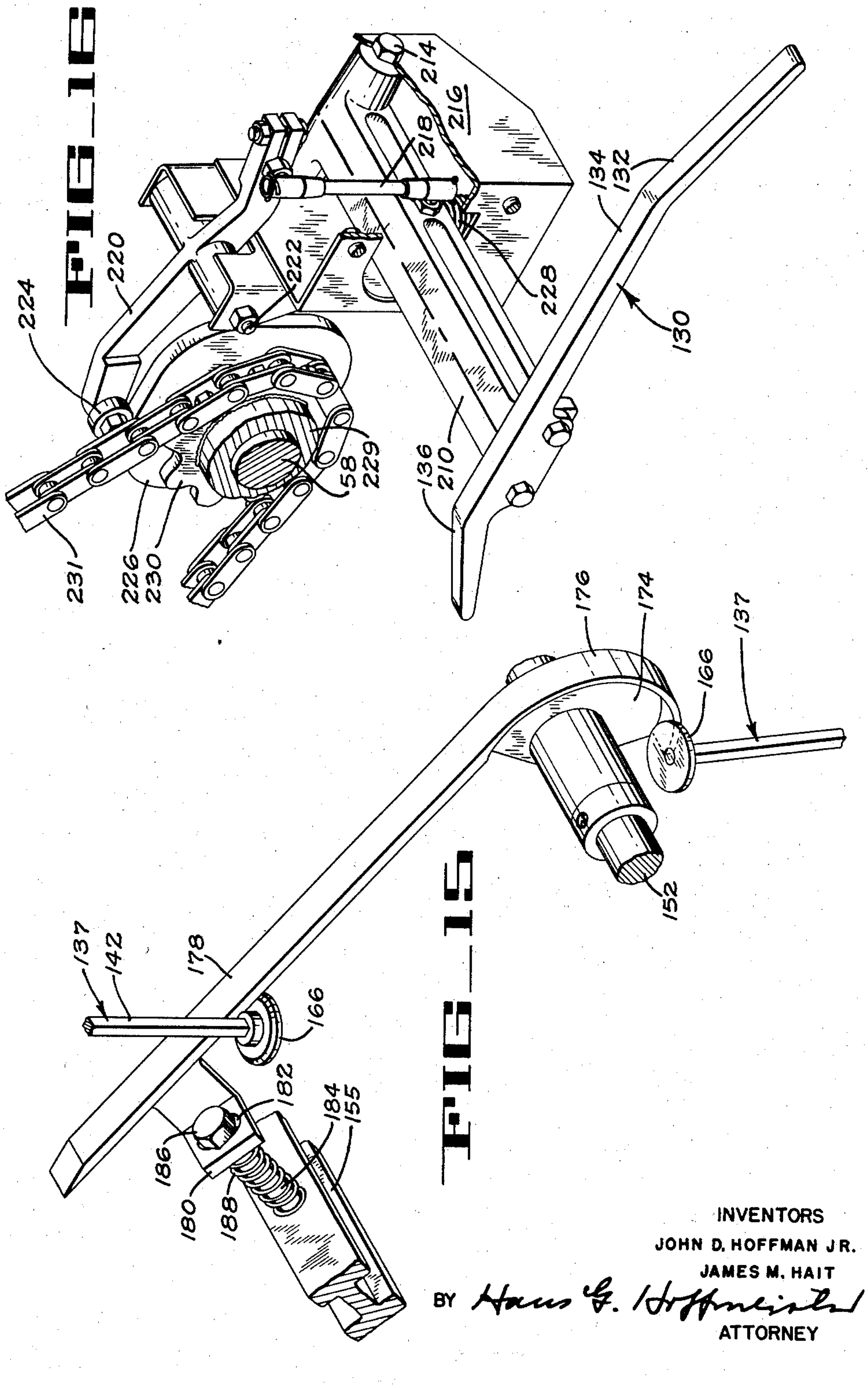
Fig. 15 is a fragmentary perspective of mechanism which controls the operation of the mechanisms shown in Figs. 11 to 14.
Fig. 16 is a fragmentary perspective of a vibratory cam track employed in the machine.
Figure 17:
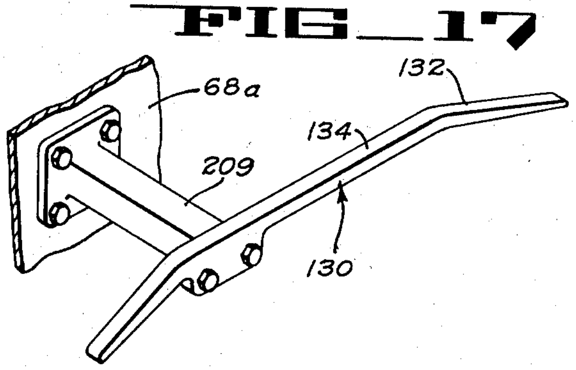
Fig. 17 is a perspective of a stationary cam track which may take the place of the vibratory cam track illustrated in Fig. 16.

The cam track 130 that lifts the finder rods 95 during the aligning operation may simply be supported from the side panel **68*a* of conveyor A by a suitable arm 209 as shown in Fig. 17. However, to promote the suture plane aligning action of the described mechanism, it may be of advantage to provide for vibration of the finder elements as they carry fruit in elevated position through the aligning zone B. For this purpose the cam track 130 may be mounted upon an arm 210 (Fig. 16) that extends laterally through a suitable aperture 212 in side panel 68*a* of the conveyor frame 70 and which has its outwardly projecting end mounted for rotation upon a horizontal shaft 214 that extends parallel to the direction of advance of the fruit on conveyor A and is suitably mounted in a bracket structure 216 secured to said side panel 68*a*. At a point adjacent the outer face of said side panel the arm 210 is connected by a universal link 218 to the end of a cam follower lever 220 that is mounted for rotation about a transverse spindle 222 supported from the bracket structure 216 at a point above and longitudinally displaced from the cam supporting arm 210. The opposite end of said cam follower lever 220 carries a roller 224 that is held in engagement with the upper sector of a four-lobed jumping cam 226 by means of a spring 228 that urges the track supporting arm 210 in an upward direction. The cam 226 is firmly mounted upon a sleeve 229 which turns loosely upon a laterally projecting extension of the drive shaft 58 of conveyor A (Figs. 1 and 16). Secured to said sleeve 229 is a small sprocket 230 that is operatively connected by a sprocket chain 231 with a large sprocket 232 fastened to the repeatedly mentioned shaft 62 of the transfer conveyor F. Due to the small size of the sprocket 230 on sleeve 229 and the large size of sprocket 232 on drive shaft 62 the cam 226 is rapidly rotated during operation of the machine, and its four lobes effect rapid oscillations of the arm 210 which, in turn, effects rapid vibration of the cam track 130 in a substantially vertical plane. The vibrations of the cam track 130, in turn, effect rapid vibrations, of small amplitude, of the elevated finder rods 95** during their travel through the aligning zone B.

Figure 14:
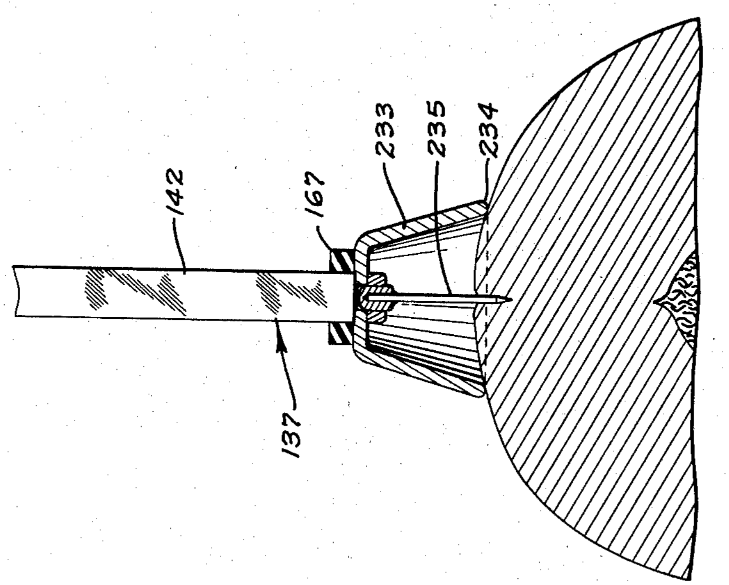
Fig. 14 is an enlarged, fragmentary detail view, similar to Fig. 13, of a modified form of the mechanism illustrated in Figs. 11, 12 and 13.

In the case of certain types of fruit, such as fruit with a very fuzzy surface, it may be desirable to reduce the frictional contact between the fruit and the cup 138 of the retaining member to thereby reduce the tendency for the cup to turn the fruit past the position of alignment of its suture plane with the vertical plane determined by the cross member 96 at the upper end of the finder element. In such cases the retaining members 137 may have a torque imparting cup 233 of the shape illustrated in Fig. 14. Said cup 233 is of a smaller diameter than the cup 138 illustrated in Fig. 13, and it lacks the peripheral edge flange 140 of the cup illustrated in said Fig. 13, so that it is actually the rounded edge 234 of the cup that engages the upper spheroidal area of the fruit, with the result that the cup 233 applies its force to the fruit at a lesser distance from the axis of rotation and over a smaller contact area. The use of a cup, such as illustrated in Fig. 14, therefore reduces the danger of continuing rotation of a fruit with respect to the finder rod 95 after alignment has been attained. However, a cup such as illustrated in Fig. 14, extends to a lesser distance down the downwardly curved surface of the blossom end of the fruit, and this reduces its dependability in retaining the fruit upon the upper end of an elevated finder rod 95. Therefore, a pin 235 is suitably secured to the lower end of the stem 142 and extends coaxially therewith to a point sufficiently far below the fruit-engaging edge 234 of cup 233 to penetrate into a fruit that is frictionally engaged by said cup.

The described fruit aligned machine may be provided with mechanism to prevent fruit, that has not been properly oriented into a stem indent downward position, from coming within reach of the fruit retaining and turning members 137 in the actual aligning zone B. For this purpose the finder rod 95 of each roller unit on conveyor A is quickly lifted for a brief period of time before it enters the actual fruit aligning zone B, and at the same time means 239 (Figs. 2 and 18) are brought to bear upon and drag the fruit, whose stem indent is not engaged by the finder rod 95 and which is therefore in a position of instability upon the finder rod, rearwardly from said rod and into contact with the trailing rollers of each unit. On the other hand said means 239 acts to prevent fruit whose stem indent is engaged by the finder rod, from dropping laterally off said rod during the elevation thereof.

Figures 18, 19, 20:
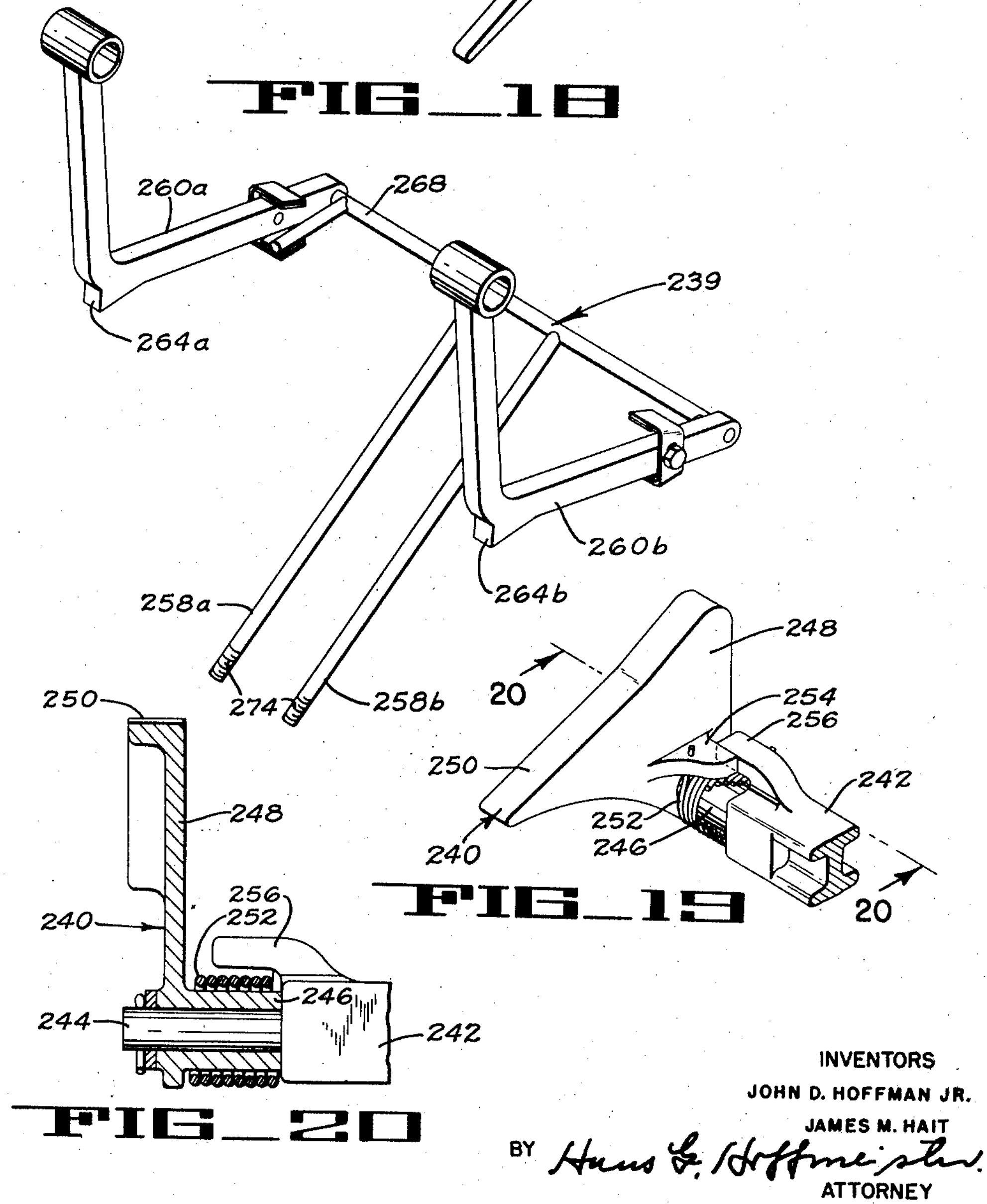
Fig. 18 is a perspective of a fruit dislodging mechanism that may be associated with the fruit supporting conveyor of the machine of the invention.
Fig. 19 is a fragmentary perspective of a cam track that cooperates with the mechanism shown in Fig. 18.
Fig. 20 is a vertical section taken along lines 20—20 of Fig. 19.

Having reference to Fig. 3 a steeply rising cam track 240 is arranged below the horizontal run of conveyor A at the feed end of the aligning zone B. Said track is supported from a transverse arm 242 (Fig. 5) that projects inwardly from side panel **68*a* of conveyor frame 70 and which forms a cylindrical tenon 244 upon which is rotatably received a sleeve 246 (Figs. 19 and 20). From said sleeve rises a web 248 or roughly triangular shape which forms along one of its side edges a laterally turned rim 250 that constitutes the actual camming surface. The sleeve 246 is yieldably held in a position wherein said camming surface rises into the path of the heads 108 at the bottom of the finder rods 95 that approach the fruit aligning zone B on the upper horizontal run of conveyor A (Fig. 3), and for this purpose a coil spring 252 wound around sleeve 246 with one of its ends anchored in an ear 254 projecting laterally from web 248 and its other end engaged behind a lip 256 formed on arm 242 urges the web 248 in clockwise direction as viewed in Fig. 19 until its ear 254 strikes against the lip 256. The described arrangement permits the cam track 240 to yield rearwardly out of its effective position in the path of the heads 108 at the bottom of the finder rods 95 in the event that the conveyor A should accidentally be operated in the reverse direction. The means for dragging misoriented fruit from the elevated finder rods comprises a pair of transversely spaced rods 258*a* and 258*b* that slant downwardly from above in the direction of the conveyor advance. Having reference in Figs. 2 and 18, two L-shaped arms 260*a* and 260*b* are pivoted near their upper ends to the side panels 154*a* and 154*b* of the overhead conveyor C at points 262*a* and 262*b* adjacent the edges of said panels at the feed end of the fruit aligning zone in such a manner that their elbows 264*a* and 264*b* bear against the end edges 266*a* and 266*b* of the outwardly turned bottom flanges 156*a* and 156*b*, respectively, of said side panels. The rearwardly extending lower bars of said L-shaped arms mount rotatably a transverse spindle 268 from which project the hereinbefore mentioned obliquely descending parallel rods 258*a* and 258*b***.

Figure 22:
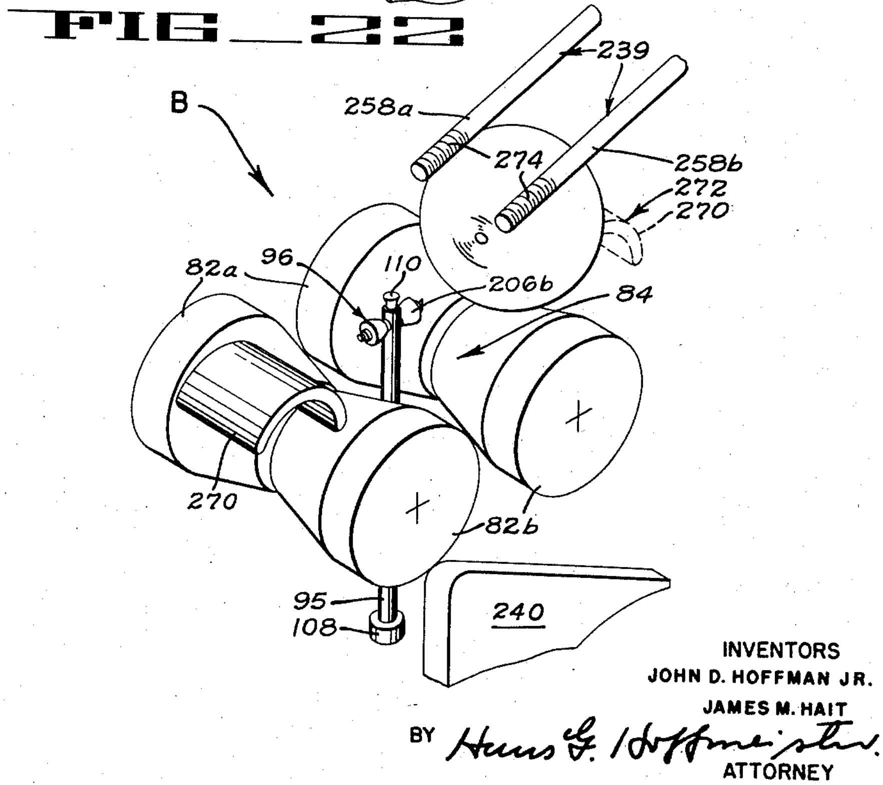

When a roller pocket 84 carries a fruit that has not been oriented to have its stem indent face downwardly and which bears therefore with a spheroidal area of its surface against the tip of the finder rod, the sudden elevation of the finder rod as effected by cam track 240 places the fruit into a condition wherein the ends of rods **258*a* and 258*b* which engage its upper area at this moment drag the fruit rearwardly from the advancing finder rod and over the trailing rollers of the pocket 84 into contact with an arcuate flange 270 (Figs. 3, 4 and 7) formed on the leading standard of the directly succeeding roller unit, as shown in Fig. 22. To increase the drag exerted by the rods 258*a* and 258*b* upon the fruit, their ends may be threaded as shown at 274 in Fig. 18. In the position illustrated in Fig. 22, the fruit is carried through the aligning zone B out of reach of the finder rod 95 of its roller pocket 84 and out of reach of the retaining and turning members 137 that descend from the overhead conveyor C; and it cannot be impaled at the leading end of conveyor A upon one of the impaling knives 276** of the transfer conveyor F, but drops into a suitable chute or trough (not shown) from where it may be returned to the feed hopper D.

Figure 21:
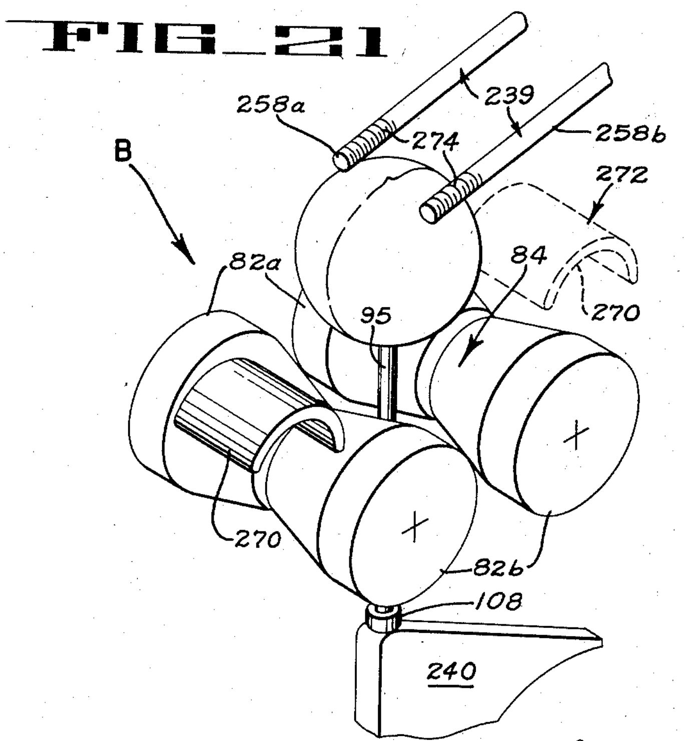
Figs. 21 and 22 are fragmentary perspectives illustrating the manner of operation of the mechanism shown in Figs. 18, 19 and 20.

On the other hand, when a fruit approaches the aligning zone B with its stem indent facing in downward direction, the upward thrust of the finder rod 95, as effected by cam track 240, is directed into the stem indent of the fruit and the roller beads **206*a* and 206*b* at the upper end of the finder rod 95 engage the bottom area of the fruit around the stem indent thereof and lift the fruit above the rollers 82*a*, 82*b* and as the fruit is lifted in this manner, the ends of rods 258*a* and 258*b* bear down upon it and inhibit upward movement of the fruit above the roller beads 206*a*, 206*b* so that they actually hold the fruit with its stem indent engaged over the upper end of the finder rod (Fig. 21). Thus, when the finder rod drops to its original level, after the head 108 at its bottom has negotiated the cam track 240, the fruit returns to its initial position wherein it rests upon the four rollers of the supporting pocket 84** with its stem indent facing downwardly.

*Operation*

While the operation of the machine embodying the invention has been concurrently explained with the description of its component mechanisms, it will now be briefly recapitulated to facilitate an understanding of the principles of the invention.

Fruit to be oriented is dumped into the rotary hopper D which feeds it individually into the roller pockets 84 of conveyor A. In said pockets the fruit is oriented to have its stem indent face downwardly in the manner described in the hereinbefore mentioned pending patent application, Ser. No. 169,042. Then, as a fruit situated in a roller pocket 84 approaches the aligning zone B, its upper area is engaged by the upwardly yielding rods **258*a* and 258*b* at either side of a vertical center plane, and the finder rod 95 of its pocket encounters the cam track 240 which lifts said rod abruptly. This causes at least partial disengagement of the fruit from the four rollers 82*a*, 82*b* of the pocket. If the fruit is properly oriented, the rods 258*a* and 258*b* will hold it with its stem indent engaged over the upper end of the finder rod, and in particular will prevent it from falling laterally off the finder rod (Fig. 21). On the other hand, if the fruit is not properly oriented and the rising finder rod engages a spheroidal area of the fruit, the rods 258*a* and 258*b* will drag it rearwardly off the finder rod (Fig. 22) over the trailing rollers 82*a*, 82*b* of the pocket 84 and bring it into contact with the arcuate flange 270 of the directly succeeding pocket 84**, as shown in Fig. 22.

After the finder rod 95 has negotiated the cam tracks 240, and has returned to its lowered position, the properly oriented fruit seats itself again into the pocket formed by the four rollers **82*a*, 82*b*, but shortly thereafter the head 108 at the lower end of the finder rod 95 encounters the rising ramp portion 132 of cam track 130 and lifts the fruit above the four rollers of its supporting pocket. Directly before this second elevation of the fruit, however, the arcuate camming rim 176 of overhead conveyor C releases the disc 166 of a retaining member 137 that moves into vertical alignment with the particular roller pocket 84 on conveyor A, and the retaining member slides downwardly and places the peripheral flange 140 of its cup 138 into contact with the blossom area of the fruit. Thus, the fruit can now be raised above its supporting rollers 82*a*, 82*b* (Figs. 3 and 13) without danger that it may fall from the elevated finder rod 95**.

Let it now be assumed that the suture plane of the fruit is not properly aligned and forms an angle with the vertical plane determined by the cross pins 204 at the upper ends of the finder rods 95, to which plane the suture planes of all the fruit are to be aligned. In such a case the roller beads **206*a* and 206*b* at the upper end of the elevated finder rod support the bottom area of the fruit adjacent to, yet outside of, the stem indent thereof as illustrated in Fig. 9. The roller beads 206*a* and 206*b* are arranged to turn so easily upon the oppositely projecting ends of the cross pin 204 that in seeking its lowest position the weight of the fruit alone may be sufficient to cause the fruit to turn on said roller beads. In some instances where the fruit happens to be almost in aligned position, this may suffice to properly align the suture plane of the fruit. In most cases, however, the fruit will have to be turned about its stem blossom axis before it reaches a position wherein its suture plane is fully aligned with the vertical plane determined by the cross pin 204 of the finder rod. As the fruit advances through the aligning zone B, while resting on the roller beads 206*a* and 206*b* and while retained upon said roller beads by the cup 138 of the retaining member 137, the disc 190 of the latter encounters the camming track 194 which causes the retaining member to turn through an angle of 180°, and owing to the frictional contact between the peripheral flange 140 of the cup 138 and the blossom area of the fruit, the fruit follows the rotational movement of the cup. This is bound to bring the elongation of its stem indent into alignment with the roller beads 206*a* and 206*b* on the cross pin 204 which causes the fruit to drop under its weight and under the weight of the retaining member 137** with its stem indent over said roller beads, and said beads settle themselves in the opposite corners of the essentially elliptical stem indent, as illustrated in Fig. 10.

While the fruit was in the misaligned position illustrated in Fig. 9, the torque applied to said fruit through the frictional contact of its blossom end with the peripheral flange 140 of the retaining cup 138, acted through the body of the fruit in a tangential direction upon the roller beads **206*a* and 206*b* causing said beads to turn and promote rotation of the fruit about its stem blossom axis. With the roller beads 206*a* and 206*b* located in the opposite ends of the stem indent, however, and bearing against the opposite side walls thereof, the torque imparted to the fruit from the turning cup 138 acts upon the beads in a radial, or almost radial, direction. This application of the torque is unable to turn said beads. The beads, therefore, remain stationary and become, in fact, abutment stops that bear against the opposite side walls of the elongated stem indent of the fruit and in this manner block further rotation of the fruit about its stem blossom axis in opposition to the torque applied to the fruit through the frictional contact of its blossom area with the peripheral flange 140 of the turning cup 138; and since said frictional contact is very light, and the torque exerted upon the fruit by the turning cup through said frictional contact is therefore of an impositive nature, the fruit will come to a halt in properly aligned position and remain keyed upon the cross member 96 while the cup 138** may continue to turn ineffectively until it has completed its 180° revolution. In the fruit aligning machine of the present invention it is unnecessary, therefore, that accurately timed means be provided for instantaneously suspending operation of the fruit turning mechanism as soon as the fruit has reached its proper position of alignment.

In some instances, however, the fruit may rotate past its position of alignment due to peculiarities in the wall surfaces of its stem indent and other imponderable factors, and may continue to turn until the torque applying member 137 has completed its 180° revolution. For such contingencies, the subsequent track 196 presents a second opportunity for the fruit to reach, and come to a halt, at its position of alignment. When the disc 190 on retaining member 137 encounters the second track 196, it turns the cup 138 in the opposite direction through an angle of 180°. In those cases where alignment of the fruit was attained during the first 180° of rotation of cup 138, the reverse rotation of said cup will remain without effect upon the fruit due to the impositive nature in which the torque is imparted to the fruit, as previously explained and owing to the fact that the rollers beads **206*a* and 206*b* within the opposite ends of the elongated stem indent of the fruit continue to act as abutment stops for the fruit in the manner described above. In those cases, however, where alignment was not achieved during the first 180° of rotation of member 137, the roller beads 206*a* and 206*b* will promote rotation of the fruit in the opposite direction under the urgency of the rotating cup 138 and during such rotation said roller beads will encounter the elongated stem indent of the fruit in a direction opposite to the direction in which they encountered said stem indent during the first rotational phase of member 137. The factors that prevented engagement of said roller beads 206*a* and 206*b* within the opposite ends of the stem indent of the fruit, or which caused them to release the fruit, are not likely to exist during an encounter from the opposite direction and the roller beads will now engage, and remain keyed within, the opposite ends of the indent and prevent further rotation of the fruit so that the fruit remains in a position wherein its suture plane is properly aligned with the vertical plane determined by the cross pin 204 at the upper end of the finder rod 95**.

After the fruit has been aligned in the described manner and the disc 190 of its retaining member 137 has passed the second track 196, the finder rod 95 of its roller pocket 84 descends from the camming track 130 and lowers the aligned fruit gently into contact with the rollers of the pocket 84. This aids in disengaging the fruit from the cup 138 of the retaining member and as the fruit emerges in aligned condition from underneath the overhead conveyor C, said conveyor withdraws the retaining member 137 swiftly in upward direction from the aligned fruit, as shown in Fig. 3.

The machine of the invention is of simple construction, it is reliable in operation and is capable of handling fruit of varying size with equal dependability and without special adjustment of any one of its component mechanisms.

While we have explained our invention with the aid of certain exemplary embodiments thereof, it will be understood that we do not wish to be limited to the specific constructional details shown and described, which may be departed from without departing from the scope and spirit of our invention.

What we claim is:

1. Apparatus for orienting fruit having a stem indent, comprising means for advancing a fruit along a predetermined path and including a member adapted to support the fruit by engagement therewith within the stem indent thereof, and means for retaining the fruit thus supported including a prong mounted for movement along a path parallel to said predetermined path in impalement with the side of the fruit opposite said member.

2. Apparatus for orienting sutured fruit having a stem indent, comprising means for advancing a fruit along a predetermined path, means for turning the fruit to dispose the stem indent thereof in a downward position, a suture plane finder movable with the advancing means and adapted to support the fruit by engagement within the stem indent, and a prong mounted for movement along a path above and parallel to said predetermined path in position to penetrate the fruit to provide lateral stability for the same while supported on the finder.

3. Apparatus for orienting sutured fruit having a stem indent, comprising means for supporting the fruit with its stem indent opening downward and with its stem blossom axis substantially vertical, said supporting means including a suture plane finder engageable with the fruit within the stem indent thereof, stabilizing means including a prong mounted above the fruit substantially in alignment with the stem blossom axis thereof, means for effecting relative movement between the fruit and the prong to cause the prong to impale the fruit and thereby offer lateral support for the fruit, and means for effecting relative rotary motion between the fruit and the finder about said axis.

4. Apparatus for orienting sutured fruit having a stem indent, comprising a suture plane finder constructed and arranged to support the fruit with its stem blossom axis substantially vertical by engagement with the fruit within the stem indent thereof, a spindle mounted above the finder for movement toward the finder and for rotation about an axis substantially in alignment with said stem blossom axis, a cup secured to the spindle with its rim in a downward position concentric with the axis of the spindle, a prong rigid with the spindle and extending axially downward therefrom to a position below the rim of said cup to impale and provide lateral support for the fruit upon downward movement of the spindle to a position wherein the cup rim engages the fruit, and means for turning the spindle to impart rotation to the fruit through frictional engagement between the cup rim and the fruit.

5. Apparatus for orienting fruit having an elongated stem indent, comprising means adapted to support the fruit by engagement within the indent of the fruit and including an elongated member adapted to interrupt rotation of the fruit about the stem blossom axis by engagement within the elongation of the indent, and means frictionally engageable with a part of the surface of the fruit substantially diametrically opposite the stem indent thereof to induce rotation of the fruit about its stem blossom axis.

6. Apparatus for orienting fruit having an elongated stem indent, comprising means for supporting a fruit with its stem blossom axis substantially vertical and its stem indent opening downward, means operative to lift the fruit off the supporting means and including an elongated member adapted to interrupt rotation of the fruit about the stem axis by engagement within the elongation of the indent, and means frictionally engageable with the surface of the fruit to increase the pressure contact of the fruit against said fruit lifting means and to induce rotation of the fruit about its stem blossom axis.

7. In a fruit orienting machine, a suture plane finder and a friction drive member mounted in opposed spaced relation for reception of an indented fruit therebetween with the finder supporting the stem end of the fruit and the drive member frictionally engaging the opposite surface of the fruit, means yieldably urging the drive member toward the finder to resist displacement of the fruit from the finder, and means for rotating the drive member to impart rotation to the fruit relative to the finder.

8. A machine for orienting fruit having an elongated stem indent, comprising means for supporting a fruit with the indent thereof facing in a predetermined direction, a keying member movably mounted in position to enter the indent of a fruit on the supporting means, a retaining member movably mounted in opposed relation to the keying member and yieldably urged toward the same to frictionally engage a fruit on said keying member, means for advancing the keying member to displace the fruit from the supporting means against the urgency of the retaining member, and means including said retaining member for rotating the fruit on the keying member about an axis extending through the indent.

9. A machine for orienting fruit having an elongated stem indent, comprising means for supporting a fruit with the indent thereof facing in a predetermined direction, a suture plane finder movably mounted in position to enter the indent of a fruit on the supporting means, a retaining member movably mounted in opposed relation to the finder and yieldably urged toward the same to frictionally engage the fruit, means for advancing the finder to displace the fruit from the supporting means against the urgency of the retaining member, and means for rotating the retaining member about an axis passing through the indent to thereby impose a friction force on the fruit urging the fruit to rotate relatively to the finder.

10. A machine for orienting sutured fruit having a stem indent elongated in the direction of the suture plane thereof, comprising means for supporting a fruit with the indent thereof facing in a predetermined direction, a suture plane finder movably mounted in position to enter the indent of a fruit on the supporting means and including a lateral extension engageable with the elongation of the indent to key the fruit to the finder when the elongation of the indent and the finder extension are in registration, a retaining member mounted in opposed relation to the finder and movable theretoward to frictionally engage the fruit on said supporting means, means for moving the finder toward the retaining member to displace the fruit from the supporting means, means for rotating the retaining member when in frictional engagement with the fruit to impose a friction force upon the fruit and thus rotate the fruit on said finder until the fruit is keyed to the finder by said lateral extension thereof.

11. Apparatus for orienting fruit having an elongated stem indent, comprising means for advancing the fruit along a predetermined path, a suture plane finder movable with and adapted to support the fruit by engagement within the downwardly opening indent thereof, a fruit retaining member mounted for movement along a path above and parallel to said predetermined path in position to frictionally engage a fruit engaged by the finder, and means for rotating the retaining member to yieldably turn the fruit on the finder.

12. Apparatus for orienting sutured fruit having a stem indent elongated along a line within its suture plane which comprises a keying member elongated along a line within the predetermined plane to which the suture plane of the fruit is to be aligned and adapted to fit into the stem indent of the fruit, means holding said keying member against rotation, drive means adapted to frictionally engage the surface of a fruit opposite its stem end to urge the fruit against said keying member, and means operable to actuate said drive means to turn a fruit on said keying member about its stem blossom axis with a force insufficient to continue turning the fruit when upon alignment of the elongation of the stem indent of the fruit with the elongation of the keying member said keying member penetrates into the stem indent and bears against the side wall thereof.

13. Apparatus for orienting sutured fruit having a stem indent elongated along a line within its suture plane, which comprises a keying member elongated along a line within the predetermined plane to which the suture plane of the fruit is to be aligned and adapted to fit into the stem indent of the fruit, means holding said keying member against rotation, drive means adapted to frictionally engage the upper surface of a fruit situated with its stem indent facing downwardly upon said keying member and to retain the fruit on said keying member, and means operable to actuate said drive means to turn a fruit on said keying member about its stem blossom axis with a force insufficient to continue turning the fruit when upon alignment of the elongation of the stem indent of the fruit with the elongation of the keying member said keying member penetrates into the stem indent and bears against the side wall thereof.

14. Apparatus for orienting sutured fruit having a stem indent elongated along a line within its suture plane which comprises a support adapted to receive the stem end of a fruit, a keying member elongated along a line within the predetermined plane to which the suture plane of the fruit is to be aligned and adapted to fit into the stem indent of the fruit, means holding said keying member against rotation and mounting it for movement from an ineffective position to an effective position wherein it lifts a fruit seated upon said fruit support means from said fruit support means, drive means adapted to frictionally engage the upper surface of a fruit with its downwardly facing stem end engaged by said keying member in effective position and to retain the fruit on said keying member, and means operable when said keying member is in its effective position to actuate said drive means to turn a fruit on said keying member about its stem blossom axis with a force insufficient to continue turning the fruit when upon alignment of the elongation of the stem indent of the fruit wtih the elongation of the keying member said keying member penetrates into the stem indent and bears against the side wall thereof.

15. Apparatus for orienting sutured fruit having a stem indent elongated along a line within its suture plane which comprises a support adapted to receive a fruit with its stem indent facing downwardly, a keying member elongated along a line within the predetermined plane to which the suture plane of the fruit is to be aligned and adapted to fit into the stem indent of the fruit, means holding said keying member against rotation and mounting it for movement from an ineffective position below said fruit support means to an effective position wherein it lifts a fruit on said fruit support means above said support means, drive means adapted to frictionally engage the blossom end of a fruit situated with its stem indent facing downwardly upon said keying member and to retain the fruit on said keying member, and means operable when said keying member is in its effective position to actuate said drive means to turn a fruit on said keying member about its stem blossom axis with a force insufficient to continue turning the fruit when upon alignment of the elongation of the stem indent of the fruit with the elongation of the keying member said keying member penetrates into the stem indent and bears against the side wall thereof.

References Cited in the file of this patent

UNITED STATES PATENTS 2,568,947 Carroll -------------- Sept. 25, 1951
2,692,669 Slagle ----------------- Oct. 26, 1954

FOREIGN PATENTS 154,128 Australia -------------- June 12, 1952